United States Patent [19]

Schissel et al.

[11] Patent Number: 5,068,352

[45] Date of Patent: Nov. 26, 1991

[54] BISIMIDODIPHENOL DERIVATIVES

[75] Inventors: David N. Schissel, Scotia; Deborah A. Haitko, Schenectady, both of N.Y.

[73] Assignee: General Electric Company, Schenectady, N.Y.

[21] Appl. No.: 606,417

[22] Filed: Oct. 31, 1990

Related U.S. Application Data

[62] Division of Ser. No. 7,467,453, Jan. 9, 1990, Pat. No. 4,988,792.

[51] Int. Cl.$^5$ .......................................... C07D 403/10
[52] U.S. Cl. ...................................... 548/461; 548/403
[58] Field of Search ................................ 548/461, 403

[56] References Cited

U.S. PATENT DOCUMENTS

| | | | |
|---|---|---|---|
| 4,476,309 | 10/1984 | Verbicky, Jr. et al. | 548/480 |
| 4,757,150 | 7/1988 | Guggenheim et al. | 548/461 |
| 4,988,821 | 1/1991 | Haitko et al. | 548/461 |

*Primary Examiner*—Mary C. Lee
*Assistant Examiner*—Michael G. Ambrose
*Attorney, Agent, or Firm*—William H. Pittman; James C. Davis, Jr.

[57] ABSTRACT

Liquid crystalline polyesteretherimides are prepared by a transesterification reaction involving terephthalic acid and acylated derivatives of 4-hydroxybenzoic acid and of certain bisimidodiphenols, or from the free bisimidodiphenol and aryl esters of the acids. In addition to being liquid crystalline, the polyesterethermides are crystalline in the solid state and have relatively high glass transition temperatures.

3 Claims, No Drawings

BISIMIDODIPHENOL DERIVATIVES

This application is a division of application Ser. No. 07/467,453 filed 01/19/90 now U.S. Pat. No. 4,988,712.

This invention relates to liquid crystalline polymers, and more particularly to a novel class of such polymers and intermediates for their preparation.

Thermotropic liquid crystalline polymers are characterized by a rigid rod structure which remains rigid in the melt, whereby the polymer molecules line up in a single direction upon application of a shearing force. They remain so aligned upon cooling, and are thus self-reinforcing in one direction; as a result, they may be formulated into high-strength fibers. Other favorable characteristics are excellent thermal properties and excellent flow properties at high temperatures, which make melt processing easy.

Various polyesterimides having actual or potential thermotropic liquid crystalline properties are known. Reference is made, for example, to U.S. Pat. Nos. 4,383,105, 4,728,713, 4,728,714 and 4,762,906; Kricheldorf et al., *J. Am. Chem. Soc..* 21, 1929–1935 (1988); Kricheldorf et al., *J. Poly. Sci., Polymer Letters Ed.*, 23, 413–419 (1985); and Kricheldorf et al., *Polymer,* 28, 1772–1778 (1987). For the most part, said polyesterimides are derived from trimellitic acid (benzene-1,2,4-tricarboxylic acid), or the structurally related compound bis(3,4-dicarboxy)benzophenone.

Also known are polyetherimides characterized by numerous beneficial properties, including high thermal stability and solvent resistance. A particularly valuable genus of polyetherimides consists of those derived from the tetracarboxylic acids 2,2-bis[4-(3,4-dicarboxyphenoxy)phenyl]propane (the dianhydride of which is sometimes hereinafter designated "BPADA") and its 2,3-dicarboxy isomer. It would be desirable to combine the properties of these polyetherimides with those of liquid crystalline polymers. However, the presence of liquid crystalline behavior cannot be predicted merely on the basis of a polymer's molecular structure.

The present invention is based on the discovery of a class of liquid crystalline polyesteretherimides, comprising structural units derived from bisimidodiphenol derivatives of the above-identified tetracarboxylic acids. The invention also includes the novel bisimidodiphenols and functional derivatives thereof.

In one of its aspects, therefore, the invention includes liquid crystalline polyesteretherimides comprising structural units of the formulas

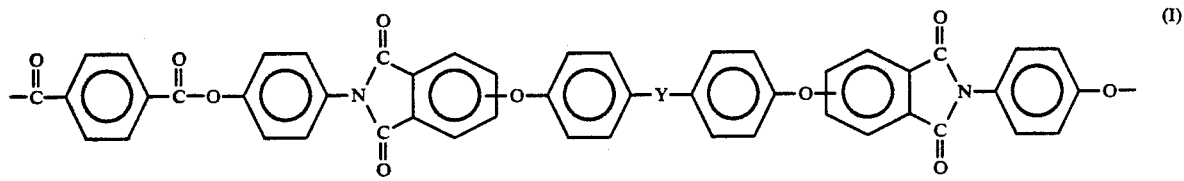

and

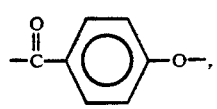

where Y is

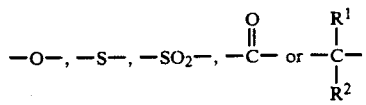

and each of $R^1$ and $R^2$ is independently hydrogen, methyl or ethyl.

It will be apparent from formula I that the polyesteretherimides of this invention are derived in part from bisimidodiphenols. Such compounds and their functional derivatives (e.g., acylated derivatives) are another aspect of the invention. They are represented by the formula

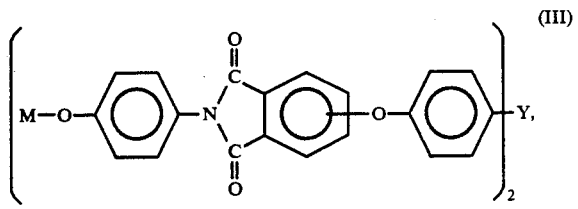

wherein M is hydrogen, one equivalent of a metal or ammonium cation or acyl and Y is as previously defined.

In formula III, M may be hydrogen or one equivalent of a metal or ammonium cation. The preferred metals are usually the alkali and alkaline earth metals. Ammonium cations include those which are unsubstituted and substituted, the latter including various amine cations.

The M value may also be an acyl radical; that is, a radical of the formula

wherein $R_3$ is an aliphatic, alicyclic or aromatic radical usually containing about 1–12 carbon atoms and is preferably a hydrocarbon radical. Most often, $R_3$ is $C_{1-6}$ alkyl or $C_{6-10}$ aryl and especially methyl. Especially preferred are the compounds of formula III in which M is hydrogen or acetyl.

The Y value is as previously defined and is usually

in which each of $R^1$ and $R_2$ may be hydrogen, methyl or ethyl. Particularly preferred are the compounds in which $R^1$ and $R_2$ are each methyl.

Thus, the preferred bisimidodiphenols are the N-bis(4-hydroxyphenyl) imides of the 2,2-bis[4(dicarboxyphenoxy)phenyl]propanes. Within this class, the bis(3,4-dicarboxy) isomer is most preferred since it is convertible to liquid crystalline polymers having particularly desirable properties.

The bisimidodiphenols of this invention may be prepared by the reaction of the corresponding 2,2-bis[4-(dicarboxyphenoxy)phenyl]propane, or a functional derivative thereof and especially the dianhydride, with p-aminophenol, under conventional imide-producing conditions. In general, the molar ratio of p-aminophenol to dianhydride is about 2:1, the reaction temperature is in the range of about 150°–200° C. and a suitable solvent, typically a relatively high boiling chlorinated aromatic compound such as o-dichlorobenzene or 1,2,4-trichlorobenzene, is employed. Conversion to a salt or acylated derivative may then be effected by conventional methods.

The structures of the units of formulas I and II indicate the most convenient methods for preparation of the polyesteretherimides; namely, by reactions between terephthalic acid, 4-hydroxybenzoic acid and bisimidodiphenol, or functional derivatives thereof. Hereinafter, these reagents will sometimes be generically designated "terephthalate reagent", "hydroxy acid reagent" and "bisimidodiphenol reagent", respectively.

In general, the most feasible reactions of this type are transesterification reactions involving the terephthalic acid and acylated derivatives of bisimidodiphenols and of 4-hydroxybenzoic acid, the acylating agent typically being a $C_{2-7}$ aliphatic carboxylic acid halide or anhydride and especially acetic anhydride.

It is also within the scope of the invention to prepare the polyesteretherimides by the reaction of the free bisimidodiphenol with such esters as diphenyl terephthalate and phenyl 4-hydroxybenzoate. Alternatively, an in situ ester preparation and transesterification procedure may be employed, in which a combination of free terephthalic and 4hydroxylbenzoic acid, the bisimidodiphenol and an esterification agent for the phenols, typically acetic anhydride, is heated under reaction conditions.

Any of the aforementioned transesterification reactions may be conducted conventionally. The terephthalate and bisimidodiphenol reagents are generally employed in substantially equimolar proportions so as to afford, at least according to theoretical stoichiometry, a product which has one carboxy and one phenolic end group and which is therefore capable of reaction with the hydroxy acid reagent to form a polymer of high molecular weight. When terephthalic acid is employed, however, it may be present in slight excess to compensate for its tendency to sublime. Proportions of the hydroxy acid reagent are usually in the range of about 10–90 mole percent, based on total reagents. Either solution or melt reaction conditions may be employed, with solution reactions typically taking place in relatively high boiling solvents such as the aforementioned o-dichlorobenzene or 1,2,4-trichlorobenzene.

The polyesteretherimides of this invention are crystalline in the solid state, and are anisotropic and highly birefringent upon melting and up to temperatures in excess of 380° C. They undergo reproducible transition between the liquid and crystalline solid state, as demonstrated by the existence of a detectable melting temperature upon reheating. In addition, they have relatively high glass transition temperatures and good tensile, flexural and impact resistant properties.

The invention is illustrated by the following examples.

EXAMPLE 1

A 5-liter 3-necked flask equipped with a stirrer and a Dean-Stark trap fitted with a reflux condenser was charged with 482 grams (0.82 mole) of BPADA, 179 grams (1.65 moles) of p-aminophenol and 3 liters of o-dichlorobenzene. The vessel was protected from light and the mixture was heated under reflux for 3 hours, with stirring, as about 1.5 liters of liquid was removed in the trap and replaced with fresh o-dichlorobenzene. A precipitate formed which was filtered, rinsed with ethyl ether and dried in vacuum at 140° C. Based upon method of preparation, the product was the desired 2,2-bis[4-(3,4-dicarboxyphenoxy)phenyl]propane bis(p-hydroxyphenyl)imide. Its melting point was 263°–265° C. The yield was 547 grams, or 95% of theoretical.

EXAMPLE 2

A mixture of 500 grams (710 mmol.) of the product of Example 1, 2.5 liters of acetic anhydride and 0.5 ml. of concentrated sulfuric acid was heated until all solids had dissolved, then cooled and filtered. The precipitation residue was washed thoroughly with water and recrystallized from 95% ethanol, yielding 530 grams (95% of theoretical) of the desired diacetoxy derivative. Its melting point was 198°–199° C.

EXAMPLE 3

A mixture of 7.86 grams (10 mmol.) of the product of Example 2, 1.80 grams (11 mmol.) of terephthalic acid and 14.40 grams (80 mmol.) of p-acetoxybenzoic acid was charged to a 100-ml. round-bottomed flask fitted similarly to that used in Example 1. The flask was immersed in a salt bath and the mixture was heated under nitrogen at 285° C. for 45 minutes, at 300° C. for 15 minutes and at 320° C. for 45 minutes. The pressure in the flask was then decreased to 2 torr and heating was continued for 30 minutes. The mixture was cooled, removed from the flask, ground to a fine powder and annealed under nitrogen at 250° C. for 24 hours. It was shown by differential scanning calorimetry and hot-stage polarized light microscopy to be the desired liquid crystalline polyesteretherimide.

EXAMPLES 4–7

The procedure followed was substantially the same as that in Example 3 except for proportions of reagents. Similar products were obtained.

EXAMPLE 8

A mixture of 31.44 grams (40 mmol.) of the product of Example 1, 12.72 grams (40 mmol.) of diphenyl terephthalate and 4.28 grams (20 mmol.) of phenyl p-hydroxybenzoate was placed in the vessel described in Example 3 and heated under nitrogen at 285° C. for 45 minutes, at 300° C. for 15 minutes and at 320° C. for 45 minutes. It was then heated under vacuum (2 torr) for 30 minutes, and further treated according to Example 3. A similar product was obtained.

The mole percentages of reagents employed in Examples 3–8, as well as certain temperature properties of the products, are given in Table I.

TABLE I

| | Example | | | | | |
|---|---|---|---|---|---|---|
| | 3 | 4 | 5 | 6 | 7 | 8 |
| Terephthalate reagent | 10 | 15 | 20 | 25 | 30 | 40 |
| Hydroxy acid reagent | 80 | 70 | 60 | 50 | 40 | 20 |
| Bisimidodiphenol reagent | 10 | 15 | 20 | 25 | 30 | 40 |
| Glass transition temperature, °C. | 199 | 233 | 210 | 203 | 200 | 205 |
| Crystalline melting temperature, °C. | 345 | 340 | 275 | 265 | 260 | 350 |

The compositions of Examples 4 and 8 were melt blended with glass fiber to yield composites comprising 70% (by weight) resin and 30% glass. The composites were molded into test parts and tested for tensile and flexural strength, notched Izod impact strength and heat distortion temperature. The results are given in Table II.

TABLE II

| Polyesteretherimide | Ex. 4 | Ex. 4 | Ex. 4 | Ex. 8 | Ex. 8 |
|---|---|---|---|---|---|
| Intrinsic viscosity, dl./g. | 2.26 | 2.26 | 2.26 | 1.55 | 1.55 |
| Mold temperature, °C. | 120 | 120 | 120 | 120 | 120 |
| Barrel temperature, °C. | 340 | 360 | 380 | 300 | 320 |
| Tensile strength, MPa. | 118.6 | 112.4 | 88.3 | 114.5 | 102.7 |
| Tensile elongation, % | 2.9 | 2.7 | 2.9 | 2.6 | 2.3 |
| Flexural strength, MPa. | 171.0 | 169.1 | 168.6 | 178.6 | 201.3 |
| Flexural modulus, GPa. | 13.5 | 13.4 | 13.6 | 12.6 | 12.6 |
| Izod impact strength, joules/m. | 75 | 59 | 59 | 53 | 64 |
| Heat distortion temperature, °C. (1.8 MPa.) | 245 | 242 | 243 | 201 | 204 |

What is claimed is:

1. A bisimidodiphenol derivative having the formula

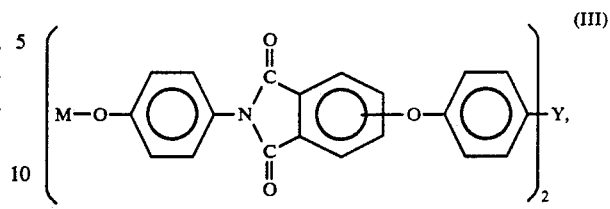

wherein M is acyl; Y is $$-O-, \quad -S-, \quad -SO_2-, \quad -\overset{\overset{O}{\|}}{C}- \quad \text{or} \quad -\overset{\overset{R^1}{|}}{\underset{R^2}{C}}-;$$

and each of $R^1$ and $R^2$ is independently hydrogen, methyl or ethyl.

2. A bisimidodiphenol derivative according to claim 1 wherein Y is isopropylidene.

3. A bisimidodiphenol derivative according to claim 1 which has the formula